UNITED STATES PATENT OFFICE.

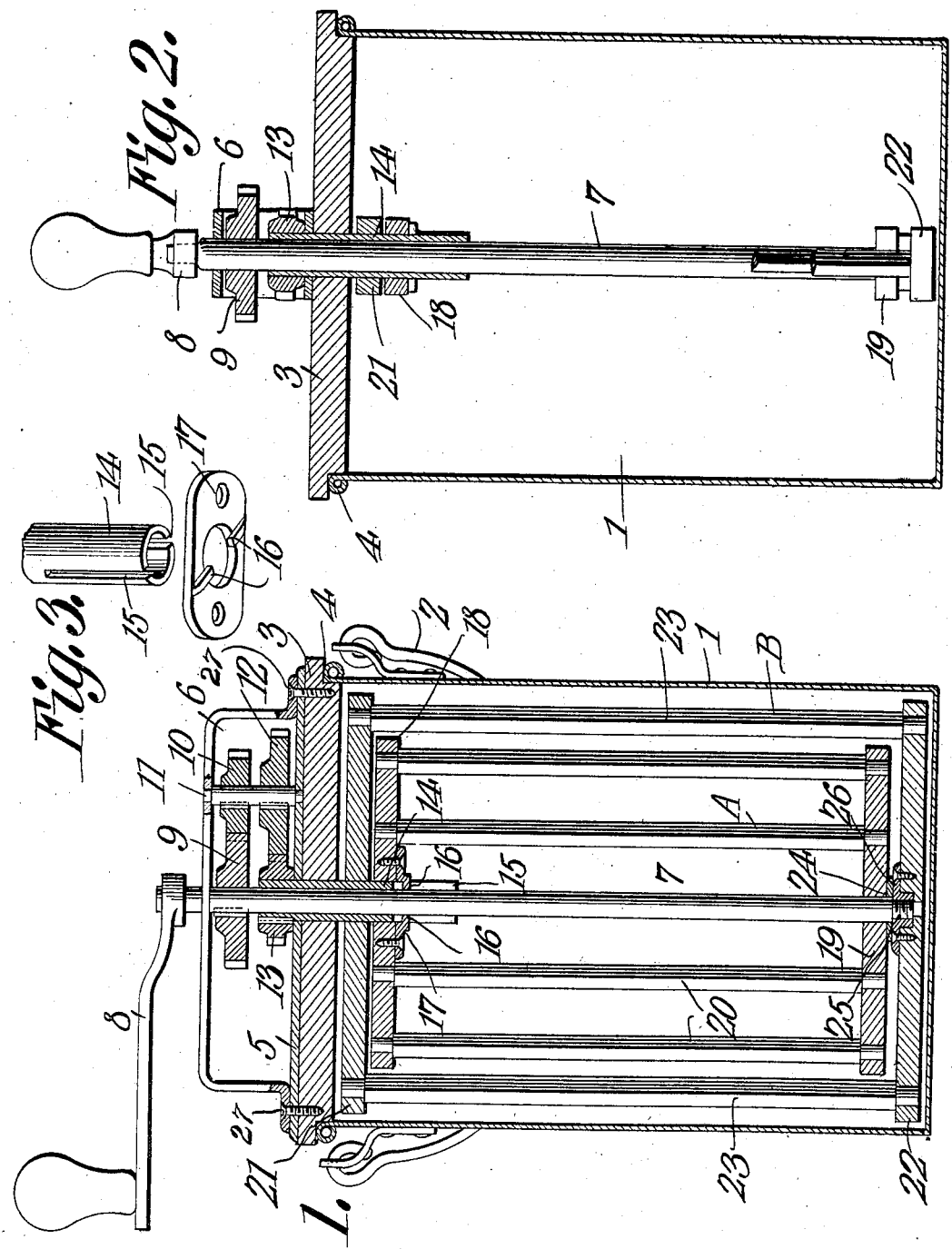

DANIEL LEROY STEWART, OF NEW VINEYARD, MAINE.

CHURN.

No. 846,872.  Specification of Letters Patent.  Patented March 12, 1907.

Application filed July 9, 1906. Serial No. 325,406.

*To all whom it may concern:*

Be it known that I, DANIEL LEROY STEWART, a citizen of the United States, residing at New Vineyard, in the county of Franklin and State of Maine, have invented a new and useful Churn, of which the following is a specification.

This invention relates to churns.

The object of the present invention is to provide a simple, durable, inexpensive, and thoroughly-efficient churn having a dasher, a peripheral scraper, and means for revolving the dasher and scraper in the same direction at different rates of speed, whereby the fast-moving dasher tends to throw the cream radially outward toward the periphery of the churn-body and the slow-moving scraper tends to remove the cream from the periphery of the churn-body and throw it toward the center into the path of the dasher, thus causing the cream to be easily and quickly converted into butter without causing undue whirling thereof and whereby the cream is prevented from spattering upward against the cover and escaping at the periphery thereof.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings, forming part of this specification, Figure 1 is a vertical section through a churn constructed in accordance with the invention. Fig. 2 is a similar view at a right angle to Fig. 1. Fig. 3 is a perspective view showing part of the dasher-sleeve and key-plate.

Like reference-numerals indicate corresponding parts in the different figures of the drawings.

The reference-numeral 1 indicates a churn-body, which preferably is in the form of an ordinary receptacle having a handle 2. The bottom of the churn-body 1 preferably is plain and free from any socket or shaft-bearing. The purpose in view in using an ordinary cylindrical receptacle for the churn-body is to permit a dairy to be equipped with a number of such receptacles to take the place of the cream-jars, and thus avoid the necessity of transferring the cream from one receptacle to another, it being understood that when the cream has been properly skimmed into the churn-body 1 the churn mechanism hereinafter described can be inserted therein to carry out the operation of producing butter.

The reference-numeral 3 indicates the churn-cover, which preferably is constructed of a circular piece of wood having a rabbeted portion 4 to fit the upper edge of the churn-body 1. Extending transversely across the cover 3 is a metallic base-plate 5, which serves not only to prevent the wooden cover from working, but also to support a metallic yoke 6. Extending downward through the yoke 6, base-plate 5, and cover 3 is a main shaft 7, which is provided at its upper end with a removable crank-handle 8. Below the yoke 6 the main shaft 7 has rigidly secured thereto in any suitable manner a gear-wheel 9 which is in mesh with a smaller gear-wheel 10, fixed upon a supplemental shaft 11, journaled vertically in the yoke 6 and base-plate 5. Fixed upon the supplemental shaft 11 below the small gear-wheel 10 is a larger gear-wheel 12, which is in mesh with a smaller gear-wheel 13, suitably fixed upon the dasher-sleeve 14, which loosely surrounds the main shaft 7. The gear-wheel 13 on the dasher-sleeve 14 bears against the upper surface of the base-plate 5 so as to support said dasher-sleeve 14, and the gear-wheel 9 bears against the upper end of the hub of the gear-wheel 13, whereby the main shaft 7 is supported indirectly upon the base-plate 5 through the medium of the small gear-wheel 13. The dasher-sleeve 14 extends downward from the gear-wheel 13 through the base-plate 5 and terminates at its lower end some distance below the cover 3, as shown, said dasher-sleeve being formed with a plurality of longitudinal slots 15, which intersect the lower end thereof and are adapted to receive the keys 16 of a key-plate 17, secured to the under surface of the upper cross-bar 18 of the dasher, which is indicated generally by A. The upper and lower cross-bars 18 and 19 of the dasher are centrally perforated to permit the passage of the main shaft 7 and are connected with each other by a plurality of longitudinal bars 20.

It will be understood that through the medium of the slots 15 in the dasher-sleeve 14 and keys 16 the dasher A is caused to rotate with the dasher-sleeve 14. The dasher A is mounted to rotate upon the main shaft 7 entirely within the rectangular scraper B, which comprises the upper and lower bars 21 22 and the longitudinal bars 23. The lower cross-bar 22 of the scraper is provided with a threaded metallic socket-piece 24, into which is screwed the lower reduced end 25 of the main shaft 7. A pair of washers or bearing-plates 26 preferably are placed between the lower cross-bar 22 of the scraper and the lower cross-bar 19 of the dasher, so as to take up the friction between these parts.

It will be obvious that the scraper B serves to hold the dasher A in raised position with its key-plate 17 and keys 16 in engagement with the slots 15 of the dasher-sleeve 14. The scraper B is held upon the main shaft 7 through the medium of the threaded socket 24 and threaded end 25, it being understood that when the shaft 7 is rotated in the proper direction the scraper B will rotate therewith and that when the shaft 7 is rotated in the reverse direction and the scraper B held stationary, either with the hand or through the medium of the butter which has been formed in the churn-body, the shaft 7 will be disconnected from the threaded socket 24, so as to permit said shaft, together with the dasher-sleeve 14 and churn-cover 3, to be withdrawn out of engagement with the dasher A and scraper B, after which these two members can be separately washed and then easily and quickly reassembled upon the main shaft 7 by merely projecting said shaft through the perforations in the cross-bars of the dasher and scraper and then rotating the same to screw it into the socket 24, at the same time slipping the dasher upward, so that its key-plate 17 and keys 16 will engage the slots 15 in the lower end of the dasher-sleeve.

By reason of the peculiar arrangement of the gear-wheels 9, 10, 12, and 13 it will be obvious that when the crank 8 is rotated in the proper direction the shaft 7 and dasher-sleeve 14 will be rotated in the same direction; but the dasher-sleeve 14 will rotate about two and one-half times faster than the shaft 7. By reason of the fact that the dasher A is connected with the dasher-sleeve 14 and the scraper B with the shaft 7 it will be obvious that the dasher and scraper will rotate in the same direction and that the dasher will rotate very much faster than the scraper.

In operation the dasher A, which preferably is provided with at least four longitudinal bars 20, each of which preferably is squared in cross-section and set so that one of its corners will act as a wedge during the rotation thereof, will tend to throw the cream outwardly by centrifugal force against the churn-body, and the slow-moving scraper B will remove the cream from the periphery of the churn-body and throw it toward the center into the path of the dasher. By means of this operation, and, further, by reason of the fact that the scraper and dasher move in the same direction, the cream is easily and quickly converted into butter without causing the same to whirl or to be spattered upward against the cover 3.

If it be desired to remove the main shaft 7 and supplemental shaft 11, together with the gear-wheels thereof, it is only necessary to withdraw the screws 27, which preferably are employed for securing the yoke 6 and the base-plate 5 to the cover 3.

From the foregoing description it will be apparent that the improved churn of this invention is strong, simple, durable, and inexpensive in construction, as well as thoroughly efficient in operation.

What is claimed is—

1. A churn having a scraper, a main shaft detachably connected with said scraper, a dasher mounted for rotation upon said shaft and located within said scraper, a key-plate mounted upon said dasher, and a dasher-sleeve having a slotted lower end engaged by the key-plate of said dasher and capable of rotation upon said main shaft.

2. A churn comprising a churn-body having a plain, flat bottom, a cover having a rabbeted portion to fit the upper end of said churn-body, a base-plate extending across said cover, a yoke mounted upon said base-plate, a main shaft extending through said yoke and base-plate and having a threaded lower end, a large gear-wheel fixed upon said main shaft, a supplemental shaft journaled in said yoke and base-plate and having a small gear-wheel meshing with the large gear-wheel on the main shaft, a large gear-wheel fixed on the supplemental shaft, a dasher-sleeve surrounding the main shaft and having a small gear-wheel meshing with the large gear-wheel on the supplemental shaft, said dasher-sleeve having slots in its lower end, a scraper having a socket to receive the threaded end of the main shaft, a dasher journaled upon said main shaft within said scraper, and a key-plate mounted upon said dasher and having keys engaging the slots of said dasher-sleeve.

In testimony that I claim the foregoing as my own I have hereto affixed my signature in the presence of two witnesses.

DANIEL LEROY STEWART.

Witnesses:
 ALZORA JACOBS,
 FRANK W. BUTLER.